US011943858B2

(12) United States Patent
Kim et al.

(10) Patent No.: US 11,943,858 B2
(45) Date of Patent: Mar. 26, 2024

(54) INDUCTION HEATING APPARATUS AND METHOD OF CONTROLLING THE SAME

(71) Applicant: LG ELECTRONICS INC., Seoul (KR)

(72) Inventors: Gwangrok Kim, Seoul (KR); Ho Yong Jang, Seoul (KR); Jung Youn Lee, Seoul (KR); Seongkyu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 454 days.

(21) Appl. No.: 17/218,576

(22) Filed: Mar. 31, 2021

(65) Prior Publication Data

US 2021/0315062 A1 Oct. 7, 2021

(30) Foreign Application Priority Data

Apr. 3, 2020 (KR) ........................ 10-2020-0041196

(51) Int. Cl.
*H05B 6/06* (2006.01)
*H05B 6/04* (2006.01)
*H05B 6/36* (2006.01)

(52) U.S. Cl.
CPC ................. *H05B 6/06* (2013.01); *H05B 6/04* (2013.01); *H05B 6/36* (2013.01)

(58) Field of Classification Search
CPC . H05B 6/04; H05B 6/06; H05B 6/062; H05B 6/36
See application file for complete search history.

(56) References Cited

U.S. PATENT DOCUMENTS

| | | | | |
|---|---|---|---|---|
| 11,523,472 | B2 * | 12/2022 | Kang | H05B 6/04 |
| 2020/0323044 | A1 | 10/2020 | Kang et al. | |
| 2022/0346196 | A1 * | 10/2022 | Kang | H02M 1/4225 |

FOREIGN PATENT DOCUMENTS

| | | | |
|---|---|---|---|
| EP | 2 618 633 | A1 | 7/2013 |
| JP | WO 2015 /159353 | A1 | 4/2017 |
| WO | WO 02/17684 | A2 | 2/2002 |
| WO | WO 2019/074246 | A1 | 4/2019 |

OTHER PUBLICATIONS

Extended European Search Report dated Aug. 25, 2021 issued in Application EP 21 16 6639.

* cited by examiner

*Primary Examiner* — Dana Ross
*Assistant Examiner* — Joe E Mills, Jr.
(74) *Attorney, Agent, or Firm* — KED & Associates LLP

(57) ABSTRACT

The present disclosure relates to an induction heating apparatus and a method of controlling the same. A controller of the induction heating apparatus according to the present disclosure may set an operation mode of an inverter circuit to a half bridge mode when a required power value of a working coil is set to a value less than a reference power value such that a driving frequency of the working coil decreases while an actual power value of the working coil is kept the same as the required power value. Additionally, the controller of the induction heating apparatus may adjust a duty ratio of a switching signal input to a switching element included in the inverter circuit, thereby adjusting the actual power value of the working coil.

17 Claims, 10 Drawing Sheets

INDUCTION HEATING APPARATUS AND METHOD OF CONTROLLING THE SAME

CROSS-REFERENCE TO RELATED APPLICATION

This application claims priority to and the benefit of Korean Patent Application No. 10-2020-0041196, filed on Apr. 3, 2020, the disclosure of which is incorporated herein by reference in its entirety.

BACKGROUND

1. Field

Disclosed herein are an induction heating apparatus and a method of controlling the same.

2. Background

Various types of cooking apparatuses are used to heat food at homes or restaurants. Gas ranges using gas as fuel have been widely used. However, in recent years, apparatuses heating a container using electric energy are used.

Methods for heating a container using electric energy are broadly classified as a resistance heating method and an induction heating method. In the resistance heating method, a container is heated by thermal energy that is generated when electric energy is supplied to a metallic resistance wire or a non-metallic heating element such as silicon carbide. In the induction heating method, a metallic container itself is heated by eddy current that is generated in the container, using a magnetic field that is generated around a working coil when electric energy is supplied to the working coil.

A theory about the induction heating method is specifically described as follows. As power is supplied to an induction heating apparatus, a high-frequency voltage having predetermined magnitude is supplied to a working coil. Accordingly, an induction magnetic field is generated around the working coil disposed in the induction heating apparatus. When a magnetic field line of the generated induction magnetic field passes through a bottom of a metallic container placed over the working coil, eddy current is generated inside the bottom of the container. As the generated eddy current flows through the container, the container itself is heated.

When a user sets a power level of a heating area, a required power value of a working coil arranged at a position corresponding to a position of the heating area is set. For example, when the power level of the heating area is set to 8, the required power value of the working coil is set to 2000 W, and when the power level of the heating area is set to 2, the required power value of the working coil is set to 500 W. That is, as the power level of the heating area increases, the required power value of the working coil also increases.

When the user sets the power level of the heating area, a controller of an induction heating apparatus sets a driving frequency of the working coil such that an actual power value of the working coil reaches the required power value corresponding to the power level set by the user. For example, when the power level of the heating area is set to 8, the driving frequency of the working coil is set to 40 kHz, and when the power level of the heating area is set to 2, the driving frequency of the working coil is set to 60 kHz. Generally, as the power level of the heating area increases, the driving frequency of the working coil decreases.

FIG. 1 is a graph showing a driving frequency of a working coil included in an ordinary induction heating apparatus, and an actual power value of the working coil corresponding to the driving frequency.

In FIG. 1, fr indicates a resonance frequency of a working coil. As illustrated in FIG. 1, a driving frequency of the working coil is generally set to a value greater than a value of the resonance frequency fr of the working coil.

If a power value, i.e., a required power value of a working coil, corresponding to a power level of a heating area set by a user, is P1, a driving frequency of the working coil is set to f1, and if a required power value of the working coil is P2 less than P1, a driving frequency of the working coil is set to f2 greater than f1.

As described above, the driving frequency of the working coil can vary depending on the required power value of the working coil. However, the driving frequency of the working coil cannot be set to a value less than the value of a resonance frequency fr. Additionally, when the driving frequency of the working coil is set to an excessively high value, temperature of a switching element or another element included in an inverter circuit supplying current to the working coil can increase and can be burned out. Accordingly, the driving frequency of the working coil can be set only to a value within a limited range.

FIG. 2 shows a change in actual power values of a working coil of an induction heating apparatus of the related art over time when a required power value of the working coil is set to 1200 W. In addition, FIG. 3 shows a change in actual power values of a working coil of an induction heating apparatus of the related art over time when a required power value of the working coil is set to 600 W.

The working coil of the induction heating apparatus of the related art is driven differently depending on a power level of a heating area set by a user, i.e., a required power value of the working coil.

FIG. 2 shows an actual power value of the working coil when the required power value of the working coil is set to 1200 W greater than 700 W that is a predetermined reference power value. The reference power value is a value that is arbitrarily set and may be set differently according to embodiments. When the required power value of the working coil is greater than the reference power value as illustrated in FIG. 2, a driving frequency of the working coil is set to a relatively low value (e.g., f1 in FIG. 1). When the driving frequency of the working coil is set to a low value as described, it is unlikely that a switching element included in an inverter circuit generates heat and is burned out. Accordingly, the working coil is driven according to a linear control method. As a result, the working coil is driven having a constant actual power value over time, as illustrated in FIG. 2.

When the required power value of the working coil is set to a value (e.g., 600 W) less than the predetermined reference power value of 700 W, the driving frequency of the working coil is set to a relatively higher value (e.g., f2 in FIG. 1). When the driving frequency of the working coil is set to a higher value as described, the switching element included in the inverter circuit may generate heat and be burned out. As a result, the working coil is driven according to an on/off control method. For example, the working coil, as illustrated in FIG. 3, is driven in an on section a1 and is not driven in an off section a2, within a first cycle (A). When the required power value of the working coil of the related art is less than the reference power value as described, the on/off driving of the working coil is repeated such that the actual power values of the working coil, added in an entire section, become identical with the required power value set by the user.

As described above, driving the working coil according to the on/off control method when the required power value of the working coil is less than the reference power value can cause the inverter circuit including the switching element to generate heat and to be burned out. Thus, an increase in the driving frequency of the working coil is limited.

However, driving the working coil according to the on/off control method as in the related art when the required power value of the working coil is less than the reference power value can cause noise repeatedly due to a periodic on/off driving of the working coil, causing inconvenience to the user.

Further, when the working coil is driven according to the on/off control method, the actual power value of the working coil hardly matches the required power value set by the user accurately, making it difficult to provide heat energy desired by the user.

BRIEF DESCRIPTION OF THE DRAWINGS

The accompanying drawings constitute a part of the specification, illustrate one or more embodiments in the disclosure, and together with the specification, explain the disclosure, wherein.

DETAILED DESCRIPTION

Figure 1:
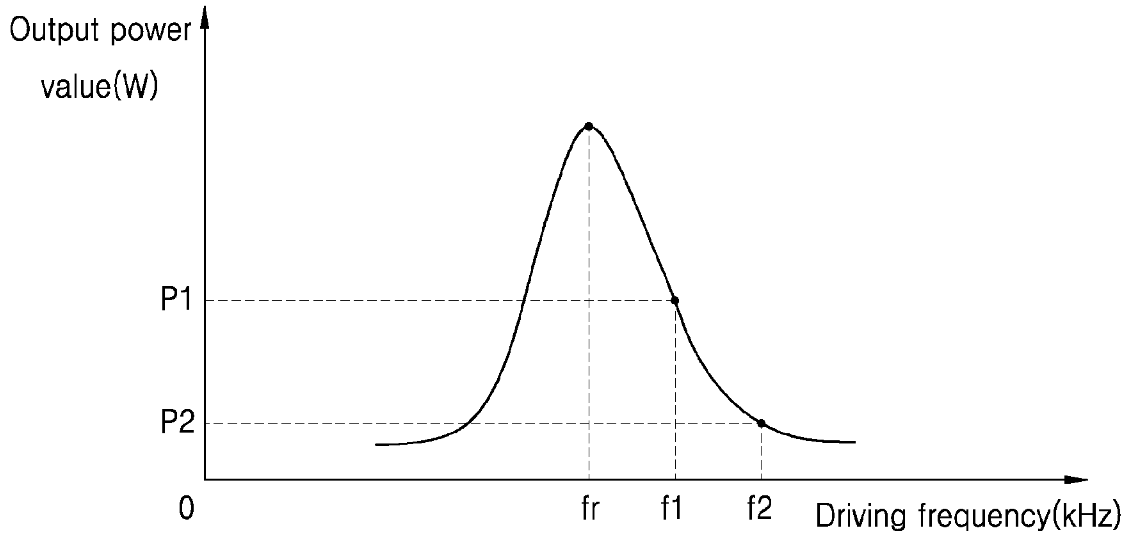
FIG. 1 is a graph showing a driving frequency of a working coil included in an ordinary induction heating apparatus, and an actual power value of the working coil corresponding to the driving frequency.
Figure 2:
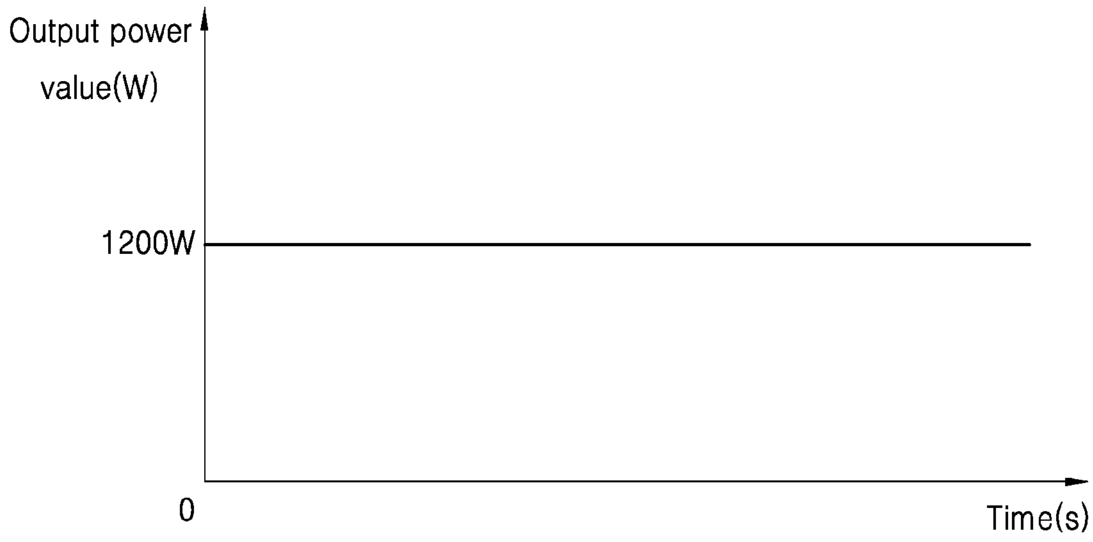
FIG. 2 shows a change in actual power values of a working coil of an induction heating apparatus of the related art over time when a required power value of the working coil is set to 1200 W.
Figure 3:
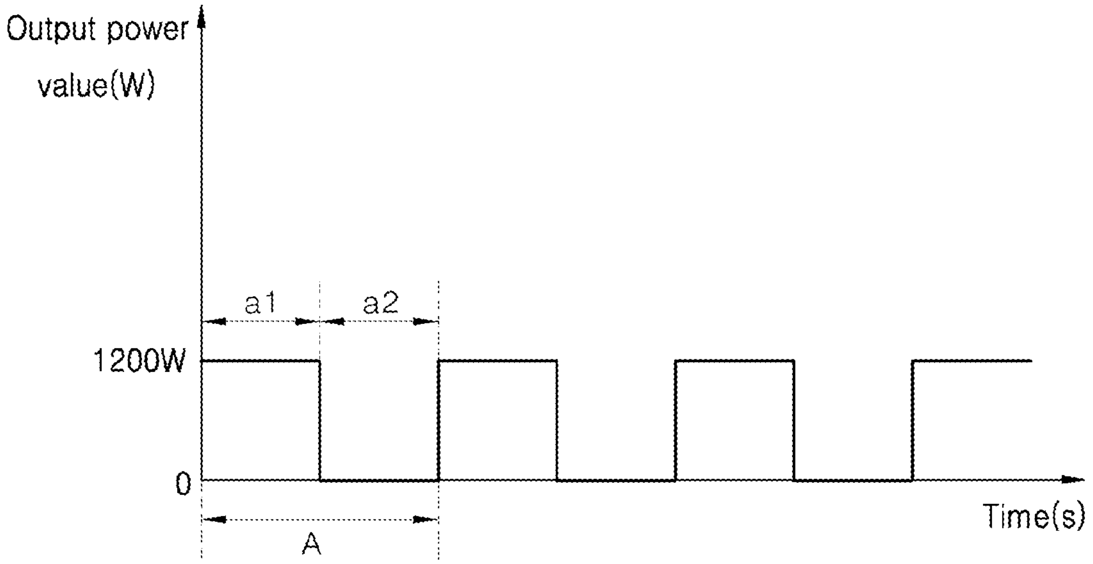
FIG. 3 shows a change in actual power values of a working coil of an induction heating apparatus of the related art over time when a required power value of the working coil is set to 600 W.

The above-described aspects, features and advantages are specifically described hereunder with reference to the accompanying drawings such that one having ordinary skill in the art to which the present disclosure pertains can easily implement the technical idea of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

Figure 4:
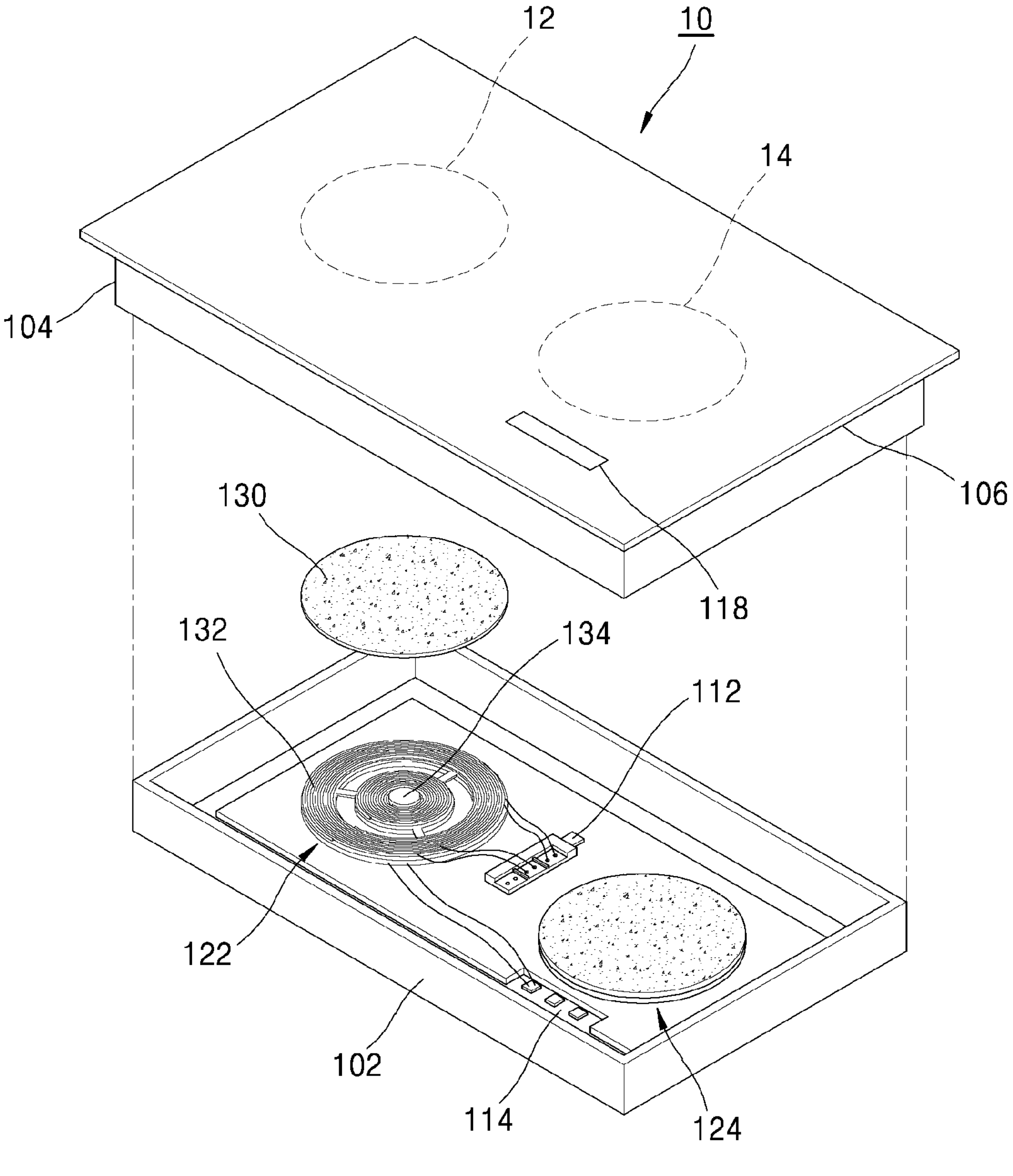
FIG. 4 is an exploded perspective view showing an induction heating apparatus according to one embodiment.

Referring to FIG. 4, an induction heating apparatus 10 according to one embodiment may include a case 102 constituting a main body, and a cover plate 104 coupled to the case 102 and configured to seal the case 102.

The cover plate 104 may be coupled to an upper surface of the case 102 and may seal a space, formed in the case 102, from the outside. The cover plate 104 may include an upper plate 106 on which a container for cooking food is placed. In one embodiment, the upper plate 106 may be made of tempered glass such as ceramic glass, but a material of the upper plate 106 may vary depending on embodiments.

Heating areas 12, 14 respectively corresponding to working coil assemblies 122, 124 may be formed on the upper plate 106. For a user to clearly recognize positions of the heating areas 12, 14, lines or figures corresponding to the heating areas 12, 14 may be printed or displayed on the upper plate 106.

The case 102 may have a hexahedron shape an upper portion of which is open. A working coil assembly 122, 124 for heating a container may be arranged in the space formed in the case 102. Additionally, an interface 114 may be arranged in the case 102, and may allow a user to supply power or may adjust a power level of each heating area 12, 14, and may display information in relation to the induction heating apparatus 10. The interface 114 may be implemented as a touch panel that makes it possible to input information as a result of touch and to display information. However, an interface 114 having a different structure may be used depending on embodiments.

Additionally, the upper plate 106 may be provided with a manipulation area 118 at a position corresponding to a position of the interface 114. For a user's manipulation, letters or images and the like may be previously printed in the manipulation area 118. The user may perform manipulation desired by the user by touching a specific point of the manipulation area 118 with reference to the letters or images previously printed in the manipulation area 118. Information output by the interface 114 may be displayed though the manipulation area 118.

The user may set a power level of each heating area 12, 14 through the interface 114. The power level may be displayed on the manipulation area 118 as numbers (e.g., 1, 2, 3, . . . , 9). When a power level of each heating area 12, 14 is set, a required power value and a driving frequency of a working coil corresponding to each heating area 12, 14 may be determined. A controller may drive each working coil such that an actual power value of each working coil matches a required power value set by the user, based on the determined driving frequency.

Additionally, a power supply 112 for supplying power to the working coil assembly 122, 124 or the interface 114 may be disposed in the space formed in the case 102.

FIG. 4 shows two working coil assemblies, i.e., a first working coil assembly 122 and a second working coil assembly 124 arranged in the case 102 as an example. However, three or more working coil assemblies may be disposed in the case 102 depending on embodiments.

The working coil assembly 122, 124 may include a working coil that forms an induction magnetic field using high-frequency alternating current supplied by the power supply 112, and a thermal insulation sheet that protects a coil from heat generated by a container. For example, the first working coil assembly 122 may include a first working coil 132 for heating a container placed in a first heating area 12, and a first thermal insulation sheet 130 in FIG. 4. Though not illustrated in the drawing, the second working coil assembly 124 may include a second working coil and a second thermal insulation sheet. Depending on embodiments, the thermal insulation sheet may not be provided.

Additionally, a temperature sensor may be disposed in a central portion of each working coil. For example, a temperature sensor 134 may be in a central portion of the first working coil 134 in FIG. 4. The temperature sensor may measure a temperature of a container in each heating area. In one embodiment, the temperature sensor may be a thermistor temperature sensor having a variable resistance whose resistance value changes according to the temperature of the container, but is not limited thereto.

In one embodiment, the temperature sensor may output a sensing voltage corresponding to a temperature of a container, and the sensing voltage output from the temperature sensor may be delivered to the controller. The controller may check the temperature of the container based on magnitude of the sensing voltage output from the temperature sensor, and when the temperature of the container is a predetermined reference value or greater, may perform an overheat prevention function by lowering an actual power value of a working coil or by stopping driving of a working coil.

Though not illustrated in FIG. 4, a substrate, on which a plurality of circuits or a plurality of elements including the controller are mounted, may be disposed in the space formed in the case 102. The controller may perform a heating operation by driving each working coil according to the user's instruction to start heating, which is input through the interface 114. When the user inputs an instruction to end heating through the interface 114, the controller may finish the heating operation by stopping the driving of the working coil.

Figure 5:
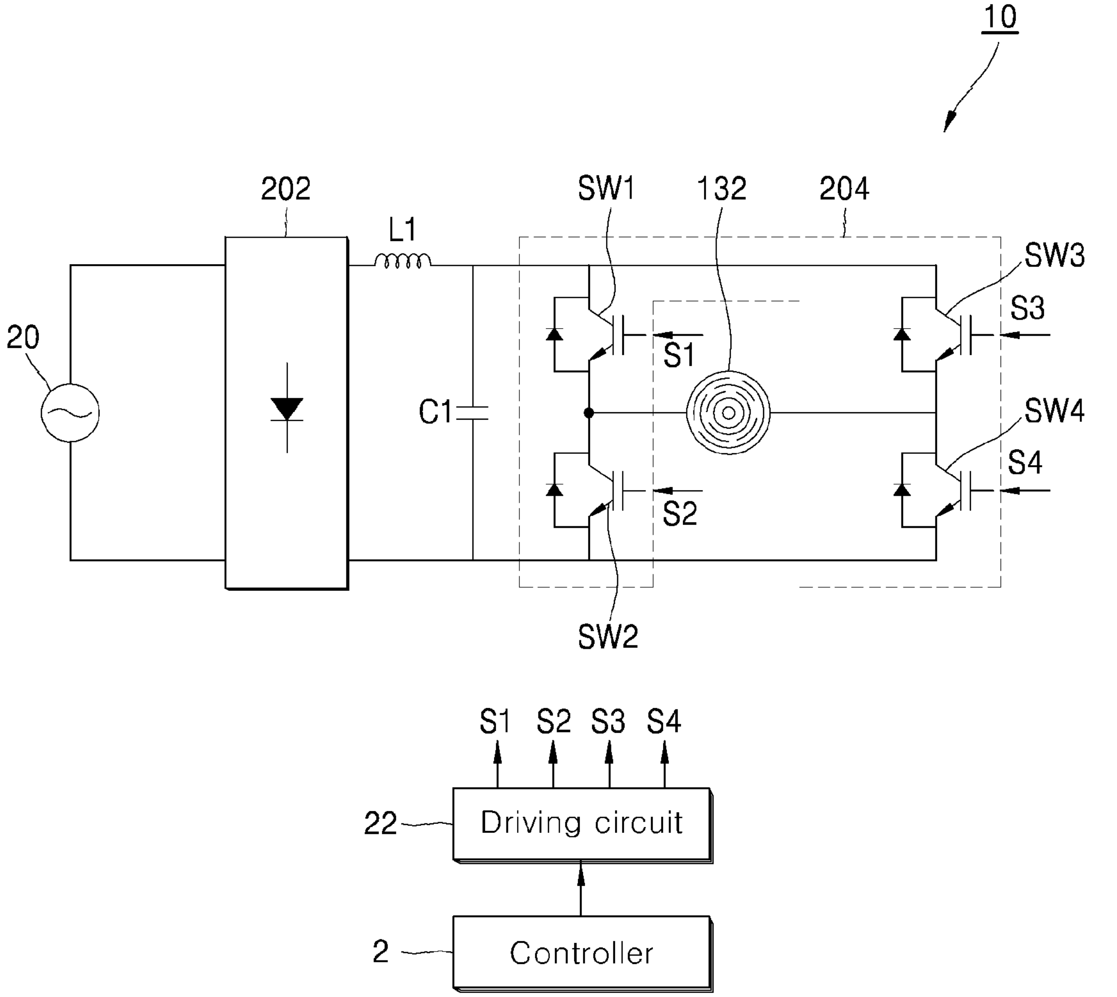
FIG. 5 is a circuit diagram showing an induction heating apparatus according to one embodiment.

FIG. 5 is a circuit diagram of an induction heating apparatus according to one embodiment.

Referring to FIG. 5, the induction heating apparatus 10 according to one embodiment may include a rectifier circuit 202, a smoothing circuit L1, C1, an inverter circuit 204, a working coil 132, a driving circuit 22, and a controller 2.

The rectifier circuit 202 may rectify an AC input voltage supplied from an input power source 20 and output a voltage having a pulse waveform. The rectifier circuit 202 may be a circuit including a plurality of diode elements, e.g., a bridge rectifier circuit.

The smoothing circuit L1, C1 may smooth the voltage rectified by the rectifier circuit 202 and output a DC link voltage. The smoothing circuit L1, C1 may include an inductor L1 and a DC link capacitor C1.

The inverter circuit 204 may convert the DC link voltage output from the smoothing circuit L1, C1 into an AC voltage for driving the working coil 132.

The inverter circuit 204 may be implemented as a full bridge inverter circuit including four switching elements, i.e., a first switching element SW1, a second switching element SW2, a third switching element SW3 and a fourth switching element SW4. Each of the first switching element SW1, second switching element SW2, third switching element SW3 and fourth switching element SW4 may be turned on or turned off by a first switching signal S1, a second switching signal S2, a third switching signal S3 and a fourth switching signal S4.

In the present disclosure, the first switching element SW1 and the second switching element SW2 may be alternatively turned on and turned off, and the third switching element SW3 and the fourth switching element SW4 may be alternatively turned on and turned off.

In the preset disclosure, turning on and turning off two switching elements alternatively may mean that when one switching element is turned on, the other switching element is turned off. For example, when the first switching element SW1 and the third switching element SW3 are turned on, the second switching element SW2 and the fourth switching element SW4 are turned off, in FIG. 5. When the first switching element SW1 and the third switching element SW3 are turned off, the second switching element SW2 and the fourth switching element SW4 are turned on. When the alternative turn-on and turn-off operations of the switching elements, described above, are repeated, a DC link voltage input to the inverter circuit 204 may be converted into an AC voltage. Accordingly, alternating current for driving of the working coil 132 may be supplied to the working coil 132.

In the present disclosure, each of the first switching signal S1, the second switching signal S2, the third switching signal S3 and the fourth switching signal S4 may be a pulse width modulation (PWM) signal having a predetermined duty ratio.

When alternating current output from the inverter circuit 204 is supplied to the working coil 132, the working coil 132 may be driven. When the working coil 132 is driven, a container over the working coil 132 may be heated while eddy current flows inside the container. Magnitude of thermal energy supplied to the container may vary depending on magnitude of power that is actually generated as a result of driving of the working coil when the working coil 132 is driven, i.e., depending on an actual power value of the working coil.

The controller 2 may determine a driving frequency of the working coil 132 such that the driving frequency corresponds to a power level of a heating area, set by the user. In one embodiment, the controller 2 may determine a driving frequency of the working coil 132 with reference to a table in which a driving frequency corresponding to each power level are recorded or with reference to a relationship equation between each power level and a driving frequency. Additionally, magnitude of power output by the working coil 132, i.e., a required power value may be determined based on a power level set by the user.

The controller 2 may supply a control signal corresponding to the determined driving frequency to the driving circuit 22. The driving circuit 22 may output a switching signal S1, S2, S3, S4 having a duty ratio corresponding to the driving frequency determined by the controller 2, based on the control signal output from the controller 2.

When the induction heating apparatus 10 is powered on as a result of the user's manipulation of the interface of the induction heating apparatus 10, the induction heating apparatus may be in a driving standby state as power is supplied to the induction heating apparatus from the input power source 20. Then the user may place a container over a working coil of the induction heating apparatus and set a power level for the container to give an instruction to start heating to the working coil. When the user makes the instruction to start heating, a power value required by the working coil 132, i.e., a required power value may be determined depending on the power level set by the user.

Having received the user's instruction to start heating, the controller 2 may determine a driving frequency corresponding to the required power value of the working coil, and may supply a control signal corresponding to the determined driving frequency to the driving circuit 22. Accordingly, the driving circuit 22 may output switching signals S1, S2, S3, S4, and the working coil 132 may be driven as the switching signals S1, S2, S3, S4 are respectively input to the switching elements SW1, SW2, SW3, SW4. When the working coil 132 is driven, eddy current may flow to the container, and the container may be heated.

In one embodiment, the controller 2 may compare a required power value of a working coil 132 with a predetermined reference power value, and as a result of comparison, may set an operation mode of the inverter circuit 204 to any one of the full bridge mode and the half bridge mode. The reference power value may be set differently depending on embodiments. The controller 2 may allow the driving circuit 22 to output switching signals S1, S2, S3, S4 having waveforms illustrated in FIG. 6 or 7, thereby setting the operation mode of the inverter circuit 204.

Figure 6:
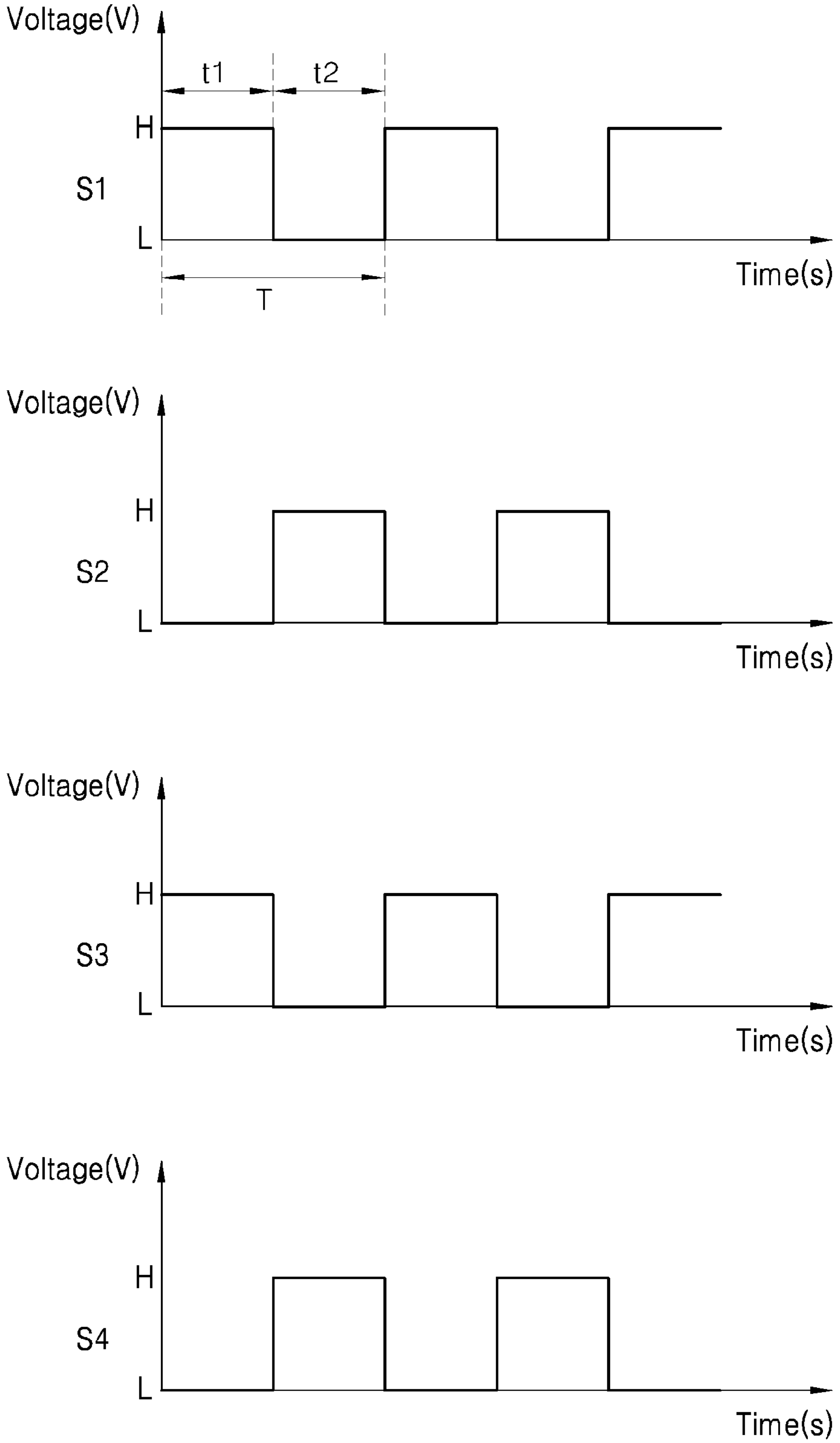
FIG. 6 shows waveforms of switching signals input to an inverter circuit when an operation mode of the inverter circuit is a full bridge mode in one embodiment.

FIG. 6 shows waveforms of switching signals input to an inverter circuit when an operation mode of the inverter circuit is a full bridge mode in one embodiment. In addition, FIG. 7 shows waveforms of switching signals input to an inverter circuit when an operation mode of the inverter circuit is a half bridge mode in one embodiment.

Figure 7:
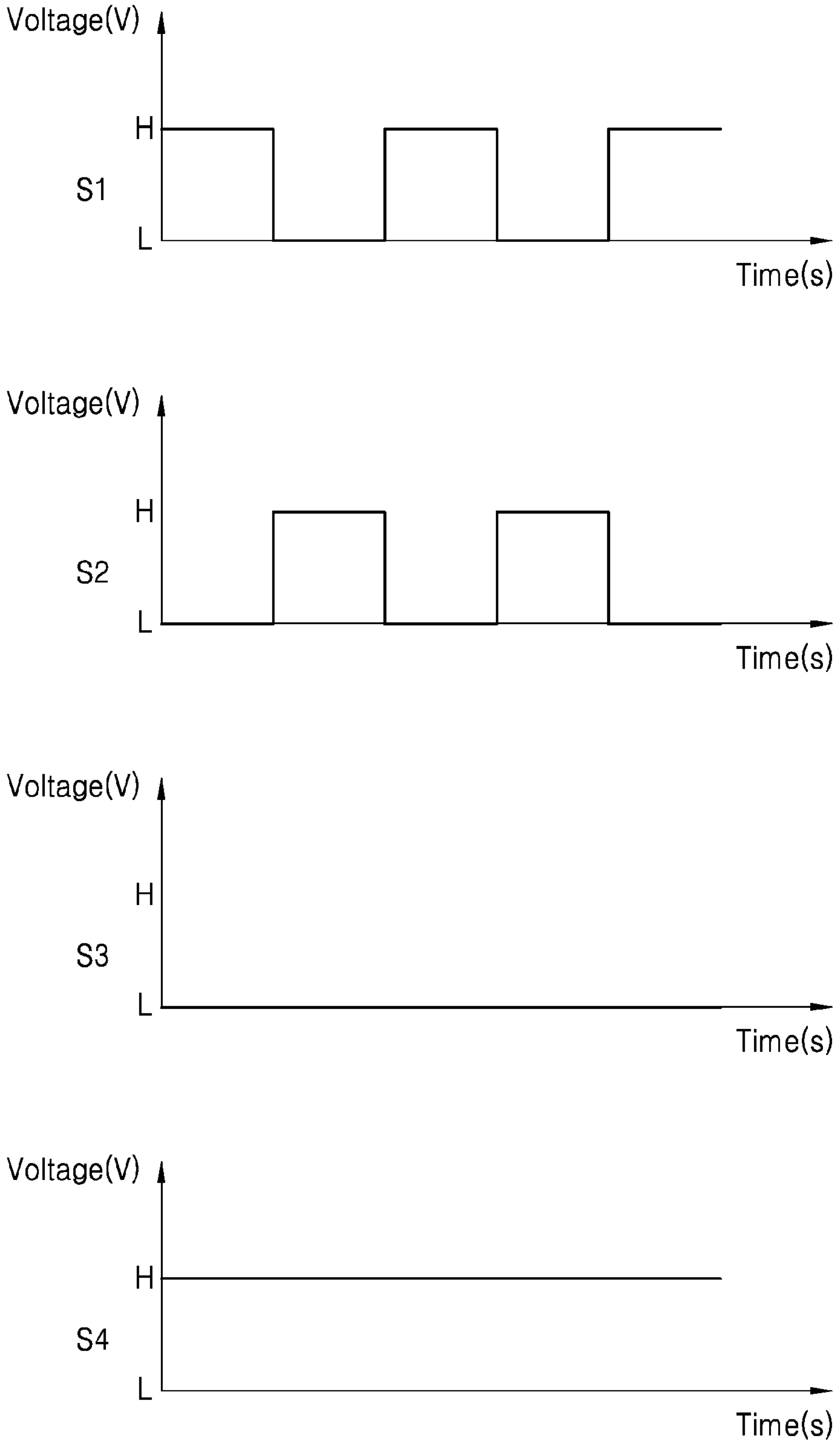
FIG. 7 shows waveforms of switching signals input to an inverter circuit when an operation mode of the inverter circuit is a half bridge mode in one embodiment.

In FIGS. 6 and 7, H denotes a high level voltage and L denotes a low level voltage. Magnitude of the high level voltage and magnitude of the low level voltage may be set differently depending on embodiments.

When a required power value of a working coil 132, set by the user, is greater than or the same as the predetermined reference power value, the controller 2 may control the driving circuit 22 such that the driving circuit outputs switching signals S1, S2, S3, S4 having waveforms illustrated in FIG. 6. Each of the switching signals S1, S2, S3, S4 illustrated in FIG. 6 may be input to each of the switching elements SW1, SW2, SW3, SW4 included in the inverter circuit 204.

A voltage of the switching signal, as illustrated, may be alternatively changed to a high level and a low level based on a predetermined cycle T. When the voltage of the switching signal is at a high level, the switching element may be turned on, and when the voltage of the switching signal is at a low level, the switching element may be turned off.

Accordingly, the first switching element SW1 and the second switching element SW2 may be alternatively turned on and turned off, and the third switching element SW3 and the fourth switching element SW4 may be alternatively turned on and turned off. As a result, the inverter circuit 204 may operate in the full bridge mode.

When a required power value of a working coil 132, set by the user, is less than the predetermined reference power value, the controller 2 may control the driving circuit 22 such that the driving circuit outputs switching signals S1, S2, S3, S4 having waveforms illustrated in FIG. 7. Each of the switching signals S1, S2, S3, S4 illustrated in FIG. 7 may be input to each of the switching elements SW1, SW2, SW3, SW4 included in the inverter circuit 204. Accordingly, the first switching element SW1 and the second switching element SW2 may be alternatively turned on and turned off. Additionally, the third switching element SW3 may be kept off, and the fourth switching element SW4 may be kept on. As a result, the inverter circuit 204 may operate in the half bridge mode.

In one embodiment, the controller 2 may change a duty ratio of each of the switching signals illustrated in FIG. 6 or 7. Referring to FIG. 6, within a first cycle T of the first switching signal S1, a section in which a voltage of the switching signal is at a high level is referred to as an on-duty section t1, and a section in which a voltage of the switching signal is at a low level is referred to as an off-duty section t2. In the present disclosure, a duty ratio of a switching signal may be defined as a ratio of an on-duty section t1 within a first cycle T of the switching signal. In an example, under the assumption that a first cycle of a switching signal is 1 second and time of an on-duty section t1 is 0.5 second, a duty ratio of the switching signal is 0.5 or 50%. In another example, under the assumption that a first cycle of a switching signal is 1 second and time of an on-duty section t1 is 0.2 second, a duty ratio of the switching signal is 0.2 or 20%.

FIGS. 6 and 7 respectively show waveforms at each switching signal's duty ratio of 50%. As illustrated in FIGS. 6 and 7, the first switching signal S1 and the second switching signal S2 may have waveforms complementary to each other, and the third switching signal S3 and the fourth switching signal S4 may have waveforms complementary to each other. Accordingly, when a duty ratio of the first switching signal S1 or the third switching signal S3 is changed, a duty ratio of the second switching signal S2 or the fourth switching signal S4 may also be changed. For example, when the duty ratio of the first switching signal S1 is changed to 70% in FIG. 7, the duty ratio of the second switching signal S2 may be changed to 30%.

Figure 8:
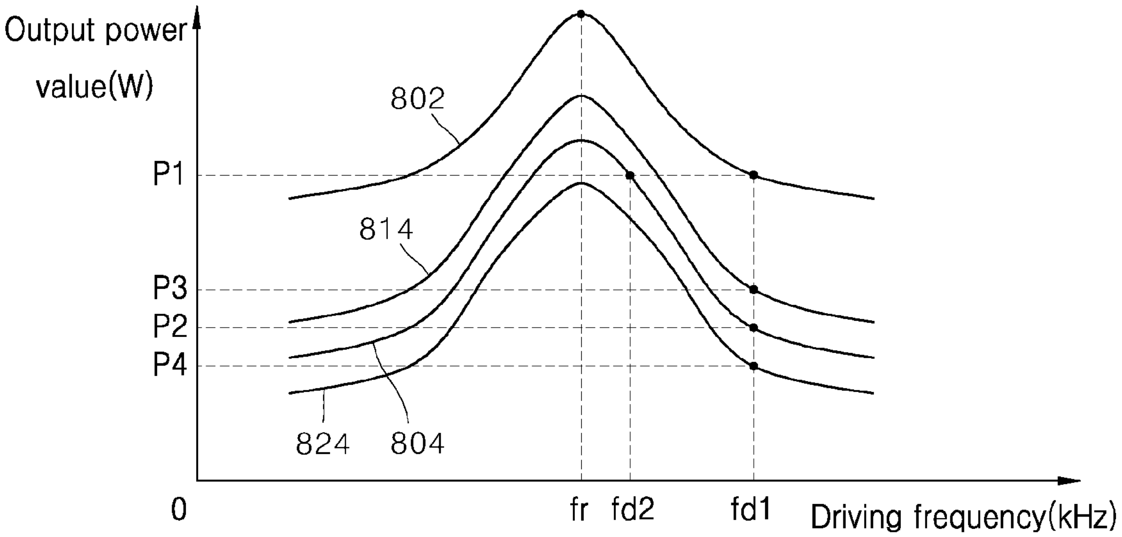
FIG. 8 is a graph showing driving frequencies and actual power values of a working coil as a result of change in an operation mode of an inverter circuit and change in a duty ratio of a switching signal in one embodiment.

FIG. 8 is a graph showing driving frequencies and actual power values of a working coil as a result of change in an operation mode of an inverter circuit and change in a duty ratio of a switching signal in one embodiment.

In FIG. 8, fr denotes a resonance frequency of a working coil 132, and fd1 and fd2 respectively denote randomly set driving frequencies of the working coil 132. (fd1>fd2) Additionally, P1 to P4 respectively denote output power values of the working coil 132. (P1>P3>P2>P4)

FIG. 8 shows a graph 802 of driving frequencies and actual power values of a working coil when the inverter circuit 204 operates in the full bridge mode, and a graph 804 of driving frequencies and actual power values of the working coil when the inverter circuit 204 operates in the half bridge mode, respectively.

As illustrated, an output power value of the working coil 132 in the full bridge-mode operation of the inverter circuit 204 may be greater than in the half bridge-mode operation of the inverter circuit. For example, when the inverter circuit 204 operates in the full bridge mode in a state in which a driving frequency of the working coil 132 is set to fd1, an actual power value of the working coil 132 may be P1. However, when the inverter circuit 204 operates in the half bridge mode in a state in which a driving frequency of the working coil 132 is set to fd1, an actual power value of the working coil 132 may be P2 less than P1.

Additionally, a driving frequency of the working coil 132 in the full bridge-mode operation of the inverter circuit 204 may be greater than in the half bridge-mode operation of the inverter circuit, as illustrated. For example, to maintain the actual power value of the working coil 132 to P1 when the working coil 132 operates in the full bridge mode, the driving frequency of the working coil 132 needs to be set to fd1. However, to maintain the actual power value of the working coil 132 to P1 when the working coil 132 operates in the half bridge mode, the driving frequency of the working coil 132 needs to be set to fd2 less than fd1.

In the present disclosure, an operation mode of the inverter circuit 204 may be changed based on a required power value of a working coil 132 considering the above features of the inverter circuit 204. That is, when the required power value of the working coil 132 is set to a value less than a reference power value, the controller 2 may input switching signals S1, S2, S3, S4 having waveforms illustrated in FIG. 7 to the inverter circuit 204 to operate the inverter circuit 204 in the half bridge mode. Accordingly, the controller 2 may decrease a driving frequency of the working coil 132 instead of increasing the driving frequency when the required power value of the working coil 132 decreases. As a result, even when the required power value of the working coil 132 is set to a value less than the reference power value, the working coil 132 may be driven according to a linear control method rather than according to an on/off control method.

Further, in one embodiment, the controller 2 may adjust a duty ratio of a switching signal input to the inverter circuit 204, thereby adjusting an actual power value of the working coil 132.

FIG. 8 shows a graph 804 in the inverter circuit 204's half bridge-mode operation at a first switching signal S1's duty ratio of 50%, a graph 814 in the inverter circuit 204's half bridge-mode operation at a first switching signal S1's duty ratio of 70%, and a graph 824 in the inverter circuit 204's half bridge-mode operation at a first switching signal S1's duty ratio of 30%, respectively.

As shown in the graphs 804, 814, 824 of FIG. 8, as a duty ratio of the first switching signal S1 becomes greater under the condition where a driving frequency of the working coil 132 is the same value of fd1, an actual power value of the working coil 132 becomes greater. Based on the above features, the controller 2 of the induction heating apparatus 10 according to the present disclosure may adjust a duty ratio of a switching signal in a state where a driving frequency of the working coil 132 is fixed, to adjust an actual power value of the working coil 132.

Figure 9:
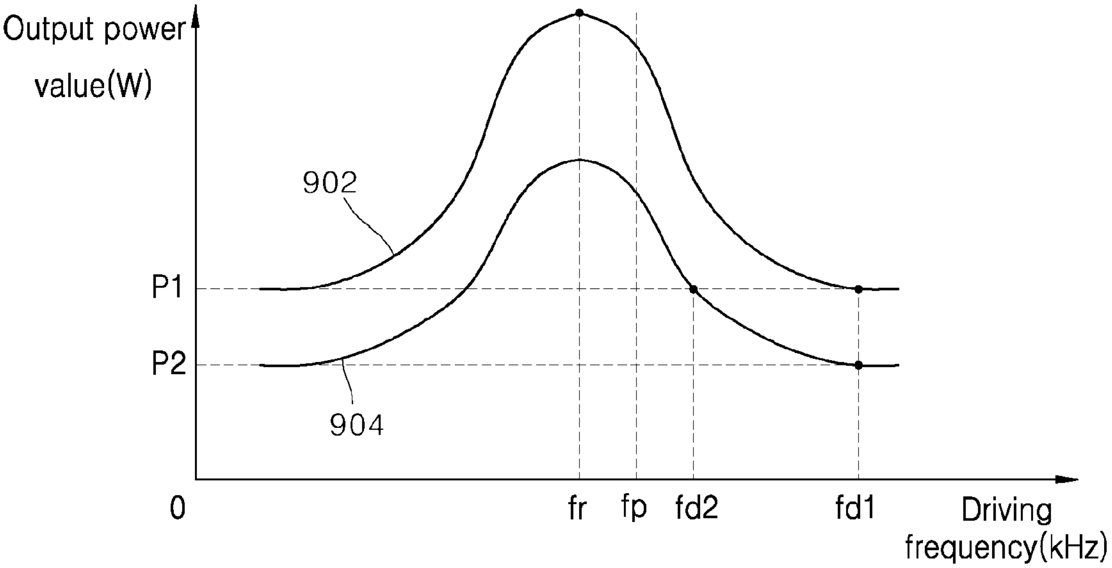
FIG. 9 is a graph for describing a method of adjusting an actual power value of a working coil as a result of change in an operation mode of an inverter circuit in one embodiment.

FIG. 9 is a graph for describing a method of adjusting an actual power value of a working coil as a result of change in an operation mode of an inverter circuit in one embodiment.

After power is supplied to the induction heating apparatus 10 and the user sets a power level of a heating area 12 and inputs an instruction to start heating, the controller 2 may confirm a required power value of a working coil 132, corresponding to the power level set by the user.

If the required power value of the working coil 132 is greater than or the same as a predetermined reference power value (e.g., 500 W), the controller 2 may determine an operation mode of the inverter circuit 204 as the full bridge mode, and may supply a control signal corresponding to a driving frequency corresponding to the required power value of the working coil 132 to the driving circuit 22. Accordingly, the driving circuit 22 may output switching signals S1, S2, S3, S4 having waveforms illustrated in FIG. 6, respectively. When the switching signals S1, S2, S3, S4 having waveforms illustrated in FIG. 6 are respectively input to the switching elements SW1, SW2, SW3, SW4 of the inverter circuit 204, the working coil 132 may be driven and may output power of the same magnitude as the required power value set by the user.

If the required power value P1 of the working coil 132 is less than the predetermined reference power value (e.g., 500 W), the controller 2 may determine an operation mode of the inverter circuit 204 as the half bridge mode, and may supply a control signal corresponding to a driving frequency corresponding to the required power value P1 of the working coil 132 to the driving circuit 22. In this case, the controller 2 may control the driving circuit 22 such that the driving circuit outputs switching signals S1, S2, S3, S4 having waveforms illustrated in FIG. 7 to change the operation mode of the inverter circuit 204 into the half bridge mode.

As illustrated in FIG. 9, the driving frequency corresponding to the required power value P1 of the working coil 132 is fd1, based on the graph 902 in the full bridge-mode operation of the inverter circuit 204. However, the controller 2 of the induction heating apparatus 10 according to the present disclosure may change the operation mode of the inverter circuit 204 to the half bridge mode as described above such that the driving frequency is changed to a value less than fd1 while the controller adjusts an actual power value of the working coil 132 to the required power value P1. Accordingly, an output power value of the working coil 132 may decrease as in the graph 904.

Additionally, the controller 2 may change a duty ratio of a first switching signal S1 output by the driving circuit 22 to a predetermined reference duty ratio. In the embodiment of FIG. 9, the reference duty ratio is set to 50%. However, the reference duty ratio may be set differently depending embodiments. In one embodiment, the reference duty ratio may be set to a minimum duty ratio of a switching signal. The minimum duty ratio denotes a smallest duty ratio among duty ratios of the switching signal, which can be set by the controller 2.

When the driving frequency of the working coil 132 is maintained at fd1 in the state 904 where the operation mode of the inverter circuit 204 is changed to the half bridge mode, the actual power value of the working coil 132 may be P2 less than P1. Accordingly, to adjust the actual power value of the working coil 132 to the required power value P1, the controller 2 may change the driving frequency of the working coil 132 from fd1 to fd2, where fd2 is a target frequency.

In this case, the controller 2 may compare a driving frequency to be changed, i.e., the target frequency fd2 of the working coil 132, with a predetermined limit frequency fp. The limit frequency fp denotes a minimum value among values that can be set as driving frequencies of the working coil 132, and may be set to a value of a resonance frequency fr or greater of the working coil 132.

When it is determined that the target frequency fd2 is greater than the limit frequency fp as illustrated in FIG. 9, the controller 2 may change the driving frequency of the working coil 132 to the target frequency fd2. Accordingly, the actual power value of the working coil 132 may become P1 the same as the required power value.

When the driving frequency of the working coil 132 is changed to the target frequency fd2, the controller 2 may supply a control signal corresponding to the target frequency fd2 to the driving circuit 22. Accordingly, the driving circuit 22 may supply switching signal S1, S2, S3, S4 illustrated in FIG. 7 to the inverter circuit 204, and the working coil 132 may be driven to output a power value of P1 while the switching elements included in the inverter circuit 204 are turned on and turned off.

When the driving frequency of the working coil 132 is changed to the target frequency fd2 less than fd1 as described above, it is unlikely that the switching elements included in the inverter circuit 204 generate heat or are burned out. Accordingly, the controller 2 may drive the working coil 132 according to the linear control method.

Figure 10:
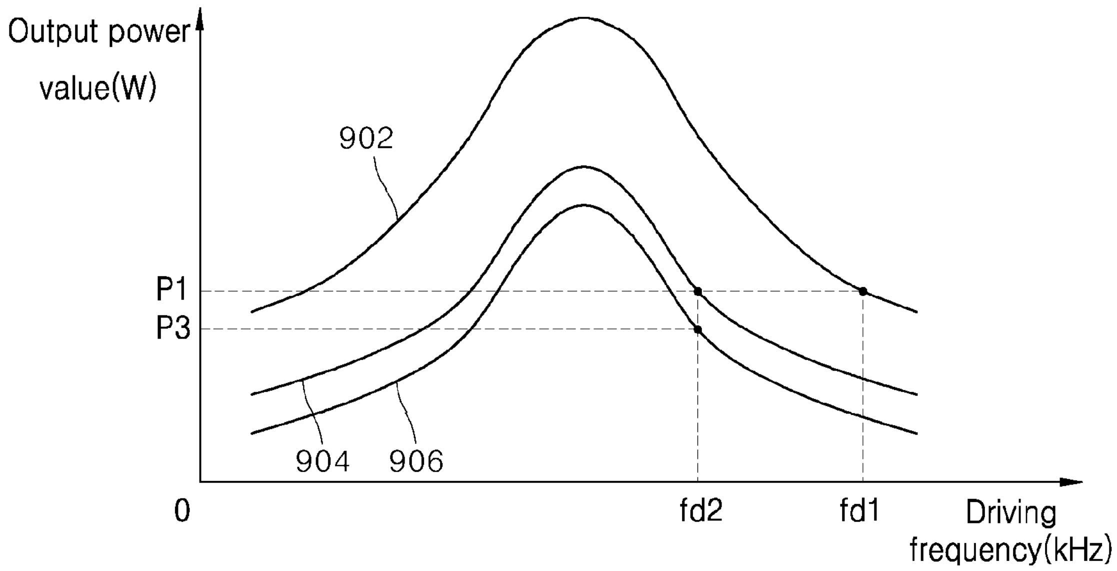
FIG. 10 is a graph for describing a method of adjusting an actual power value of a working coil as a result of adjustment of a duty ratio of a switching signal in one embodiment.

FIG. 10 is a graph for describing a method of adjusting an actual power value of a working coil as a result of adjustment of a duty ratio of a switching signal in one embodiment.

When the user changes the required power value of the working coil 132 in the state where the driving frequency of the working coil 132 is changed to the target frequency fd2 and the working coil 132 is driven to output the power value of P1 as in the embodiment described with reference to FIG. 9, the controller 2 may change a duty ratio of the first switching signal S1 input to the inverter circuit 204 to adjust an actual output value of the working coil 132.

For example, when the required power value of the working coil 132 is changed to P3 in the state where the driving frequency of the working coil 132 is changed to the target frequency fd2 and the working coil 132 is being driven, the controller 2 may change the duty ratio of the first switching signal S1 output by the driving circuit 22 from 50% to 30%. Accordingly, the actual power value of the working coil 132 may decrease from P1 to P3, as an entire output power value of the working coil 132 decreases as in the graph 906.

Though not illustrated in the drawing, the controller 2 may increase the duty ratio of the first switching signal S1 output by the driving circuit 22 to increase the actual power value of the working coil 132.

Figure 11:
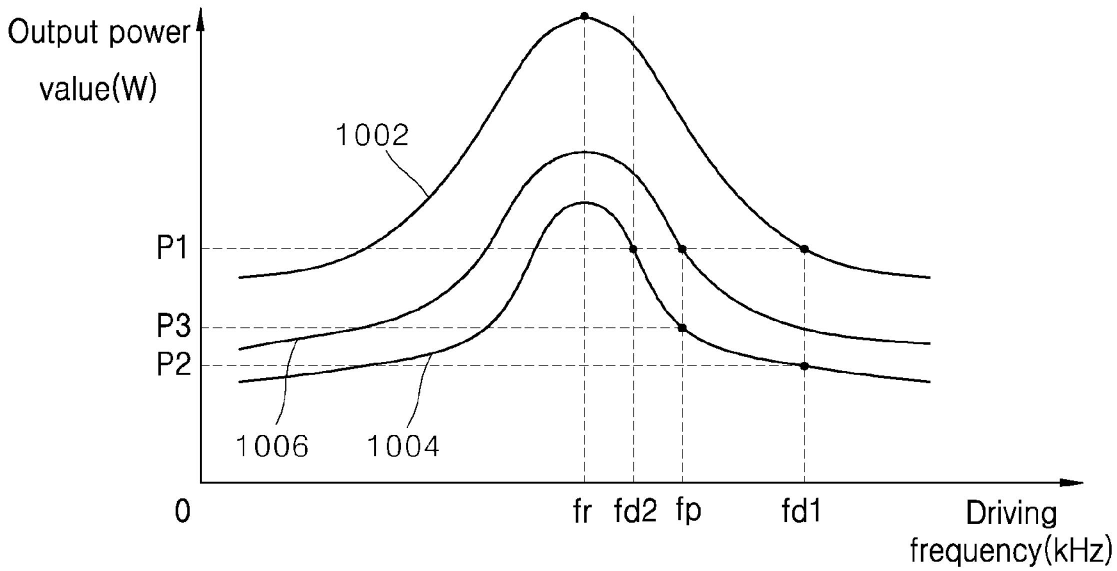
FIG. 11 is a graph for describing a method of adjusting an actual power value of a working coil when a target frequency of the working coil is less than a limit frequency in one embodiment.

FIG. 11 is a graph for describing a method of adjusting an actual power value of a working coil when a target frequency of a working coil is less than a limit frequency in one embodiment. Here, it is noted that although the limit frequency is not indicated in FIG. 10, FIG. 10 may illustrate a method of adjusting an actual power value of a working coil when a target frequency of a working coil is equal to or larger than a limit frequency in one embodiment.

When the required power value P1 of the working coil 132, set by the user, is less than the reference power value, the controller 2 may change the operation mode of the inverter circuit 204 to the half bridge mode and change the duty ratio of the first switching signal S1 to the predetermined reference duty ratio (e.g., 50%). Accordingly, the output power value of the working coil 132 when the operation mode of the inverter circuit 204 is the half bridge mode (see graph 1004 in FIG. 11) is lower than the output power value of the working coil 132 when the operation mode of the inverter circuit 204 is the full bridge mode. (see graph 1002 in FIG. 11)

When the driving frequency of the working coil 132 is maintained at fd1 in the state where the operation mode of the inverter circuit 204 is changed to the half bridge mode, the actual power value of the working coil 132 may be P2 and may not match the required power value P1. Accordingly, the controller 2 may determine a target frequency of the working coil 132. As illustrated in FIG. 11, since the output power value of the working coil 132 is changed as in the graph 1004, the target frequency may be determined as fd2 such that the actual power value of the working coil 132 becomes P1.

Then the controller 2 may compare the target frequency fd2 with a limit frequency fp. Since the limit frequency fp denotes a minimum value among settable driving frequencies of the working coil 132, the driving frequency of the working coil 132 may not be set to be a value less than the limit frequency fp. Accordingly, when the target frequency fd2 is less than the limit frequency fp as in the embodiment of FIG. 11, the controller 2 may set the driving frequency of the working coil 132 to the limit frequency fp rather than the target frequency fd2.

When the driving frequency of the working coil 132 is set to the limit frequency fp as illustrated in FIG. 11, the actual power value of the working coil 132 is P3 rather than P1. Accordingly, the controller 2 may increase the duty ratio of the first switching signal S1 from 50% to 70% such that the actual power value of the working coil 132 matches the required power value P1. As a result, the entire output power value of the working coil 132 may be changed as in the graph 1006, and in the state where the driving frequency of the working coil 132 is set to the limit frequency fp, the actual power value of the working coil 132 may become identical with the required output value P1.

When the driving frequency of the working coil 132 is changed to the limit frequency fp less than fd1 as described, it is unlikely that the switching elements included in the inverter circuit 204 generate heat or are burned out. Accordingly, the controller 2 may drive the working coil 132 according to the linear control method.

In the above method of controlling the induction heating apparatus 10, even when the required power value of the working coil 132 is less than the reference power value, the working coil 132 may be driven according to the linear control method. Thus, when the working coil 132 is driven, noise may not be generated, and the actual power value of the working coil 132 may match the required power value accurately.

Figure 12:
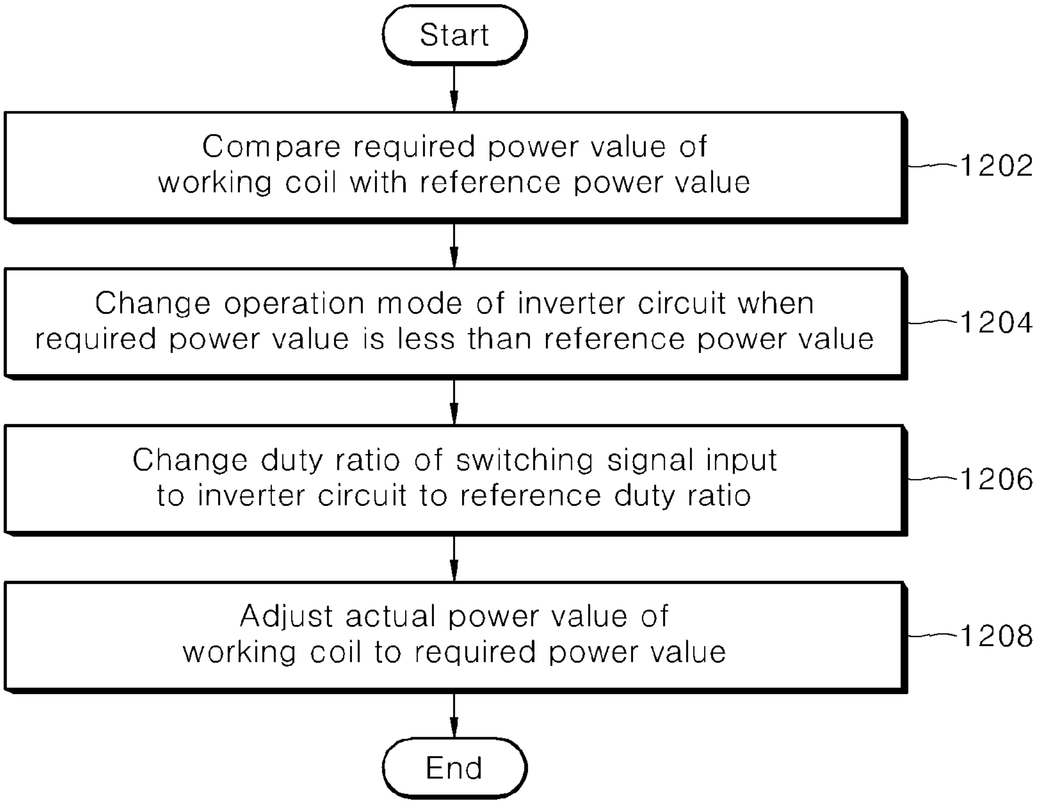
FIG. 12 is a flow chart showing a method of controlling an induction heating apparatus according to one embodiment.

FIG. 12 is a flow chart showing a method of controlling an induction heating apparatus according to one embodiment.

A controller 2 of the induction heating apparatus 10 according to one embodiment may compare a required power value of a working coil 132 with a reference power value (1202).

When the required power value is less than the reference power value as a result of comparison, the controller 2 may change an operation mode of an inverter circuit 204 (1204). In one embodiment, the controller 2 may set the operation mode of the inverter circuit 204 to a half bridge mode.

Though not illustrated in the drawing, when the required power value is greater than or the same as the reference power value, the controller 2 may set the operation mode of the inverter circuit 204 to a full bridge mode.

Then the controller 2 may change a duty ratio of a switching signal input to the inverter circuit 204 to a reference duty ratio (1206). In one embodiment, the reference duty ratio may be set to a minimum duty ratio of the switching signal, but the disclosure is not limited thereto. The reference duty ratio may also be set to 50%.

Then the controller 2 may adjust an actual power value of the working coil 132 to the required power value (1208). In one embodiment, adjusting an actual power value of the working coil 132 to the required power value (1208) may include changing a driving frequency of the working coil 132 to a target frequency corresponding to the required power value.

Additionally, in one embodiment, adjusting an actual power value of the working coil 132 to the required power value (1208) may include changing the driving frequency of the working coil 132 to a predetermined limit frequency when the target frequency corresponding to the required power value is less than the limit frequency, and changing the duty ratio of the switching signal input to the inverter circuit 204 such that the actual power value of the working coil 132 matches the required power value.

Though not illustrated in the drawing, when the required power value is changed after step 1208 is performed, the controller 2 may change the duty ratio of the switching signal input to the inverter circuit 204 to adjust the actual power value of the working coil 132.

Figure 13:
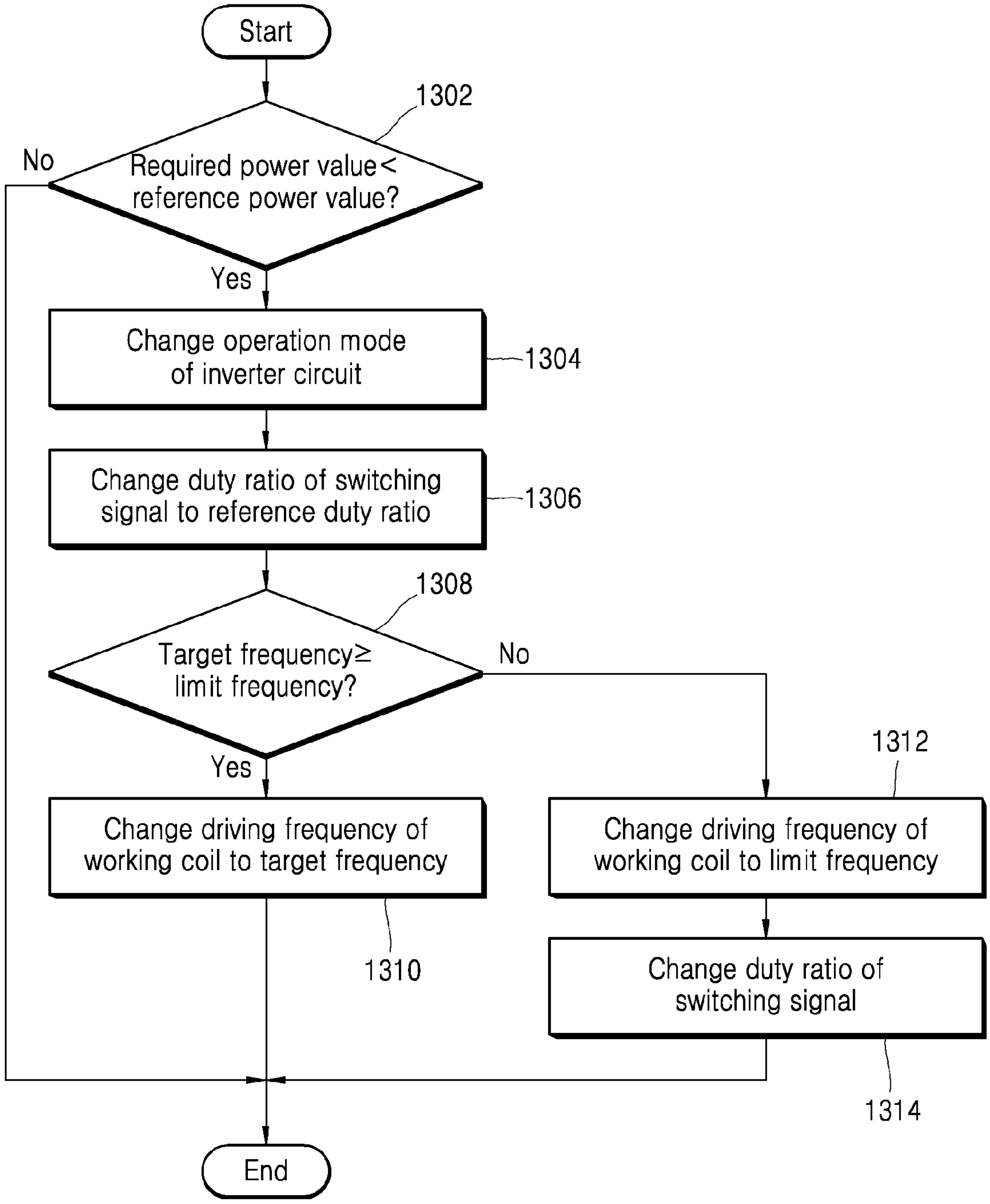
FIG. 13 is a flow chart showing a method of controlling an induction heating apparatus according to another embodiment.

FIG. 13 is a flow chart showing a method of controlling an induction heating apparatus according to another embodiment.

When a power level of a heating area is set by a user, a required power value of a working coil 132 may be determined. A controller 2 may compare a required power value of the working coil 132, set by the user, with a reference power value (1302).

When the required power value is not less than the reference power value as a result of comparison in step 1302, the controller 2 may perform a heating operation by driving the working coil 132 without additional control such that an actual power value of the working coil 132 matches the required power value.

When the required power value is less than the reference power value as a result of comparison in step 1302, the controller 2 may change an operation mode of an inverter circuit 204 (1304), e.g. from a full bridge mode to a half bridge mode. In one embodiment, the controller 2 may allow a driving circuit 22 to output switching signals (S1, S2, S3, S4) illustrated in FIG. 7 to change the operation mode of the inverter circuit 204 to a half bridge mode.

Then the controller 2 may change duty ratios of the switching signals output from the driving circuit 22 to a reference duty ratio (1306). In one embodiment, the controller 2 may change a duty ratio of a first switching signal S1 among the switching signals illustrated in FIG. 7 to the reference duty ratio. The reference duty ratio may be set differently depending on embodiments, and may be set to a minimum duty ratio of a switching signal.

Then the controller 2 may compare a target frequency with a limit frequency (1308). The target frequency denotes a driving frequency of the working coil 132 when the actual output value of the working coil 132 matches the required output value set by the user. The limit frequency denotes a minimum value, which can be set by the controller 2, among driving frequencies of the working coils 132, and may be set differently depending on embodiments.

When the target frequency is not less than the limit frequency as a result of comparison in step 1308, the controller 2 may change a driving frequency of the working coil 132 to the target frequency (1310). Accordingly, the actual power value of the working coil 132 may be adjusted to the required power value.

When the target frequency is less than the limit frequency as a result of comparison in step 1308, the controller 2 may change a driving frequency of the working coil 132 to the limit frequency (1312). Then the controller 2 may change a duty ratio of a switching signal of the working coil 132 (1314) to adjust the actual power value of the working coil 132 to the required power value.

When the actual power value of the working coil 132 is adjusted to the required power value, the controller 2 may drive the working coil 132 according to the linear control method, and a heating operation may be performed.

According to the present disclosure, when a required power value of a working coil of the induction heating apparatus is set to be a low value, noise caused by the on/off driving of the working coil may be removed.

Additionally, according to the present disclosure, when a required power value of a working coil of the induction heating apparatus is set to be a low value, an actual power value of the working coil may match the required power value accurately.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical idea of the disclosure. Further, the effects and predictable effects drawn from the configurations in the disclosure are to be included within the range of the disclosure though not explicitly described in the description of the embodiments.

Technical Problem

An object of the present disclosure is directed to an induction heating apparatus and a method of controlling the same that can remove noise generated due to on/off driving of a working coil when a required power value of the working coil of the induction heating apparatus is set to a low value.

Another object of the present disclosure is directed to an induction heating apparatus and a method of controlling the same that can match an actual power value of the working coil and a required power value accurately when the required power value of the working coil of the induction heating apparatus is set to a low value.

Aspects according to the present disclosure are not limited to the above ones, and other aspects and advantages that are not mentioned above can be clearly understood from the following description and can be more clearly understood from the embodiments set forth herein. Additionally, the aspects and advantages of the present disclosure can be realized via means and combinations thereof that are described in the appended claims.

Technical Solution

One or more of these objects are solved by the features of the independent claim.

An inverter circuit of an induction heating apparatus according to the present disclosure may be implemented as a full bridge circuit, e.g., a circuit including four switching elements. An individual switching signal may be input to the four switching elements included in the inverter circuit. A controller of the induction heating apparatus according to the disclosure may adjust waveforms of the four switching signals to change an operation mode of the inverter circuit to a full bridge mode and a half bridge mode.

In the disclosure, when the inverter circuit operates in the full bridge mode, each of the four switching elements included in the inverter circuit may be alternatively turned on and turned off. In the disclosure, when the inverter circuit operates in the half bridge mode, two of the switching elements included in the inverter circuit may be alternatively turned and turned off while the remaining two switching elements may be kept on or off.

The controller of the induction heating apparatus according to the disclosure may compare a required power value of a working coil, set by a user, with a predetermined reference power value to determine an operation mode of the inverter circuit. In one embodiment, when the required power value of the working coil is greater than or the same as the reference power value, the controller may set the operation mode of the inverter circuit to the full bridge mode. When the required power value of the working coil is less than the reference power value, the controller may set the operation mode of the inverter circuit to the half bridge mode.

An actual power value of the working coil in the inverter circuit's half bridge-mode operation may be less than in the inverter circuit's full bridge-mode operation, at the same frequency. Accordingly, the controller of the induction heating apparatus according to the disclosure may set the operation mode of the inverter circuit to the half bridge mode when the required power value of the working coil is set to a value less than the reference power value such that a driving frequency of the working coil decreases while the actual power value of the working coil is kept the same as the required power value.

The controller of the induction heating apparatus according to the disclosure may adjust a duty ratio of the switching signal input to the switching element included in the inverter circuit to adjust the actual power value of the working coil.

As a result of control described above, the working coil may be driven according to the linear control method rather than the on/off control method of the related art when the required power value set by the user is less than the reference power value. Accordingly, noise generated due to the on/off driving of the working coil may be removed, and heat energy desired by the user may be provided.

An induction heating apparatus according to one aspect of the present disclosure may include a working coil, an inverter circuit including a plurality of switching elements and supplying current to the working coil, and a controller configured to compare a required power value of the working coil with a predetermined reference power value, to change an operation mode of the inverter circuit when the required power value is less than the reference power value, to change a duty ratio of a switching signal input to the inverter circuit to a predetermined reference duty ratio, and to adjust an actual power value of the working coil to the required power value. The reference power value is a value that is arbitrarily set and may be set differently according to embodiments.

A method of controlling an induction heating apparatus according to another aspect may include comparing a required power value of a working coil with a predetermined reference power value, changing or setting an operation mode of an inverter circuit when the required power value is less than the reference power value, changing a duty ratio of a switching signal input to an inverter circuit to a predetermined reference duty ratio, and adjusting an actual power value of the working coil to the required power value. Here, the duty ratio of the switching signal may be changed, when the operation mode is changed. In one embodiment, the method may be for controlling an induction heating apparatus according to any one of the herein described embodiments or aspects.

At least one of these aspects may include one or more of the following preferred features.

In one embodiment, the controller may be configured to perform a method according to any one of the embodiments or aspects described herein.

In one embodiment, the controller may change or set the operation mode of the inverter circuit to a half bridge mode when the required power value is less than the reference power value.

In one embodiment, the reference duty ratio may be set to a minimum duty ratio of the switching signal.

In one embodiment, the controller may change a duty ratio of a switching signal input to the inverter circuit to the reference duty ratio. In one embodiment, the controller then may change a driving frequency of the working coil to a target frequency corresponding to the required power value such that an actual power value of the working coil matches the required power value. The target frequency may be a driving frequency at which the actual power value matches the required power value for the reference duty ratio in the set half bridge mode.

In one embodiment, the controller may change a duty ratio of a switching signal input to the inverter circuit to the reference duty ratio. Then, when a target frequency corresponding to the required power value is less than a predetermined limit frequency, the controller may change a driving frequency of the working coil to the limit frequency, and/or may change a duty ratio of the switching signal input to the inverter circuit such that an actual power value of the working coil matches the required power value.

In one embodiment, the controller may adjust the actual power value of the working coil to match the required power value. Then, when the required power value is changed, the controller may change a duty ratio of a switching signal input to the inverter circuit.

In one embodiment, changing or setting an operation mode of an inverter circuit when the required power value is less than the reference power value may include changing the operation mode the inverter circuit into a half bridge mode, e.g. from a full bridge mode.

In one embodiment, the reference duty ratio may be set to a minimum duty ratio of the switching signal and/or to 50%.

In one embodiment, adjusting an actual power value of the working coil to the required power value may include changing a driving frequency of the working coil to a target frequency corresponding to the required power value. The target frequency may be a driving frequency at which the actual power value matches the required power value for the reference duty ratio in the set half bridge mode. Additionally or alternatively, an actual power value of the working coil to the required power value may include changing the duty cycle to a target duty cycle corresponding to the required power value. The target duty cycle may be a duty cycle at which the actual power value matches the required power value for a predetermined driving frequency, e.g. a predetermined limit frequency or the target frequency, in the set half bridge mode.

In one embodiment, adjusting an actual power value of the working coil to the required power value may include changing a driving frequency of the working coil to a predetermined limit frequency when a target frequency corresponding to the required power value is less than the limit frequency, and/or changing a duty ratio of a switching signal input to the inverter circuit such that an actual power value of the working coil matches the required power value.

The method of controlling an induction heating apparatus according to one embodiment may further include changing a duty ratio of a switching signal input to the inverter circuit when the required power value is changed.

According to the present disclosure, when a required power value of a working coil of an induction heating apparatus is set to be a low value, noise caused by the on/off driving of the working coil may be removed.

Additionally, according to the present disclosure, when a required power value of a working coil of an induction heating apparatus is set to be a low value, an actual power value of the working coil may match the required power value accurately.

What is claimed is:

1. An induction heating apparatus, comprising:

a working coil configured to heat an object;

an inverter circuit that includes a plurality of switching elements, and configured to supply current to the working coil, wherein each of the switching elements is associated with a different corresponding one of a plurality of switching signals; and a controller configured to:

compare a set power value of the working coil with a predetermined reference power value, change an operation mode of the inverter circuit to a half bridge mode when the set power value is determined to be less than the reference power value, change a duty ratio of a first one of the switching signals to a predetermined reference duty ratio, and change an actual power value of the working coil to the set power value of the working coil.

2. The induction heating apparatus of claim 1, wherein when the set power value is determined to be greater than the predetermined reference power value, the inverter circuit is to operate in a full bridge mode.

3. The induction heating apparatus of claim 1, wherein the predetermined reference duty ratio is set to a minimum duty ratio of the first one of the switching signals.

4. The induction heating apparatus of claim 1, wherein the controller is configured to change the duty ratio of the first one of the switching signals to the predetermined reference duty ratio, and then to change a driving frequency of the working coil to a target frequency corresponding to the set power value such that the actual power value of the working coil corresponds to the set power value of the working coil.

5. The induction heating apparatus of claim 1, wherein the controller is configured to:

change the duty ratio of the first one of the switching signals to the predetermined reference duty ratio, and when a target frequency corresponding to the set power value is less than a predetermined limit frequency, change a driving frequency of the working coil to the limit frequency, and change the duty ratio of the first one of the switching signals such that the actual power value of the working coil corresponds to the set power value of the working coil.

6. The induction heating apparatus of claim 1, wherein the controller is configured to:

change the actual power value of the working coil to correspond to the set power value of the working coil, and when the set power value has changed, change the duty ratio of the first one of the switching signals.

7. A method of an induction heating apparatus that includes a working coil and an inverter circuit having a plurality of switching elements, and each of the switching elements is associated with a different corresponding one of a plurality of switching signals, the method comprising:

comparing a set power value of the working coil with a predetermined reference power value;

changing an operation mode of the inverter circuit to a half bridge mode when the set power value is determined to be less than the reference power value;

changing a duty ratio of a first one of the switching signals to a predetermined reference duty ratio; and changing an actual power value of the working coil to the set power value of the working coil.

8. The method of claim 7, wherein the predetermined reference duty ratio is set to a minimum duty ratio of the first one of the switching signals.

9. The method of claim 7, wherein the changing of the actual power value of the working coil includes changing a driving frequency of the working coil to a target frequency corresponding to the set power value of the working coil.

10. The method of claim 7, wherein the changing of the actual power value of the working coil includes:

changing a driving frequency of the working coil to a predetermined limit frequency when a target frequency corresponding to the set power value is less than the predetermined limit frequency; and changing a duty ratio of the first one of the switching signals such that the actual power value of the working coil corresponds to the set power value of the working coil.

11. The method of claim 7, further comprising:

in response to change of the set power value, changing the duty ratio of the first one of the switching signals.

12. An induction heating apparatus comprising:

a working coil configured to support an object to be heated;

an inverter device to provide power to the working coil, the inverter device including a plurality of switching elements;

a driving circuit to provide a plurality of switching signals, each of the switching signals is to be provided to a different corresponding one of the plurality of switching elements;

a controller configured to provide a control signal to the driving circuit to control the plurality of switching signals, the controller is configured to:

change an operation mode of the inverter device to a half bridge mode when a set power value of the working coil is determined to be less than a predetermined reference power value, change a duty ratio of a first one of the switching signals to a predetermined reference duty ratio, and change an actual power value of the working coil to the set power value of the working coil.

13. The induction heating apparatus of claim 12, wherein when the set power value is determined to be greater than the predetermined reference power value, the inverter circuit is to operate in a full bridge mode.

14. The induction heating apparatus of claim 12, wherein the predetermined reference duty ratio is set to a minimum duty ratio of the first one of the switching signals.

15. The induction heating apparatus of claim 12, wherein the controller is configured to change the duty ratio of the first one of the switching signals to the predetermined reference duty ratio, and then to change a driving frequency of the working coil to a target frequency corresponding to the set power value such that the actual power value of the working coil corresponds to the set power value of the working coil.

16. The induction heating apparatus of claim 12, wherein the controller is configured to:

change the duty ratio of the first one of the switching signals to the predetermined reference duty ratio, and when a target frequency corresponding to the set power value is less than a predetermined limit frequency, change a driving frequency of the working coil to the limit frequency, and change a duty ratio of the first one of the switching signals such that the actual power value of the working coil corresponds to the set power value of the working coil.

17. The induction heating apparatus of claim 12, wherein the controller is configured to:

adjust the actual power value of the working coil to correspond to the set power value of the working coil, and when the set power value has changed, change the duty ratio of the first one of the switching signals.

* * * * *